No. 638,640. Patented Dec. 5, 1899.
W. M. MEHRING.
COW MILKER.
(Application filed Feb. 8, 1899.)
(No Model.) 3 Sheets—Sheet 1.
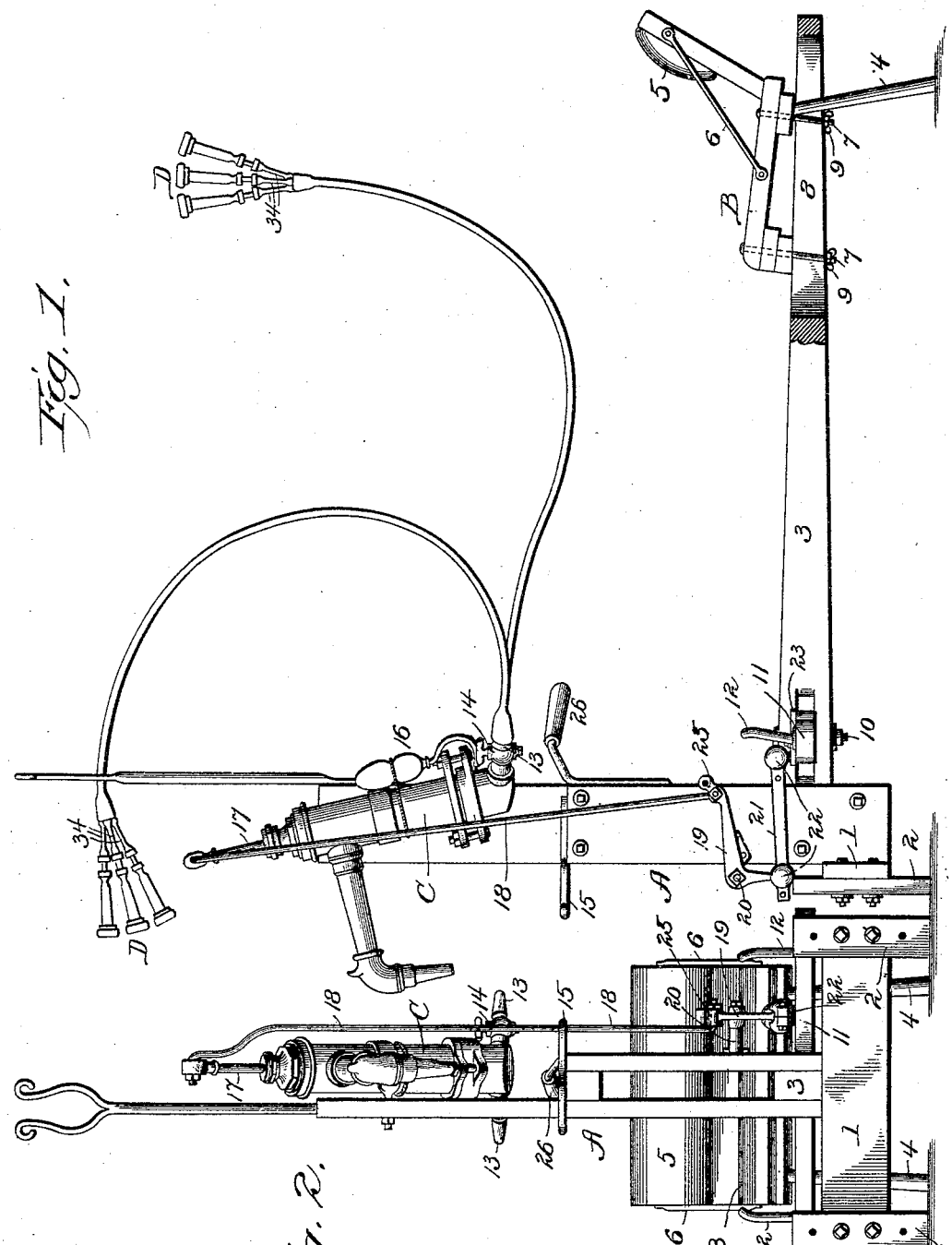
Witnesses
Inventor
William M. Mehring,
per Rhea G. D. Bois & Co.
his Attorneys

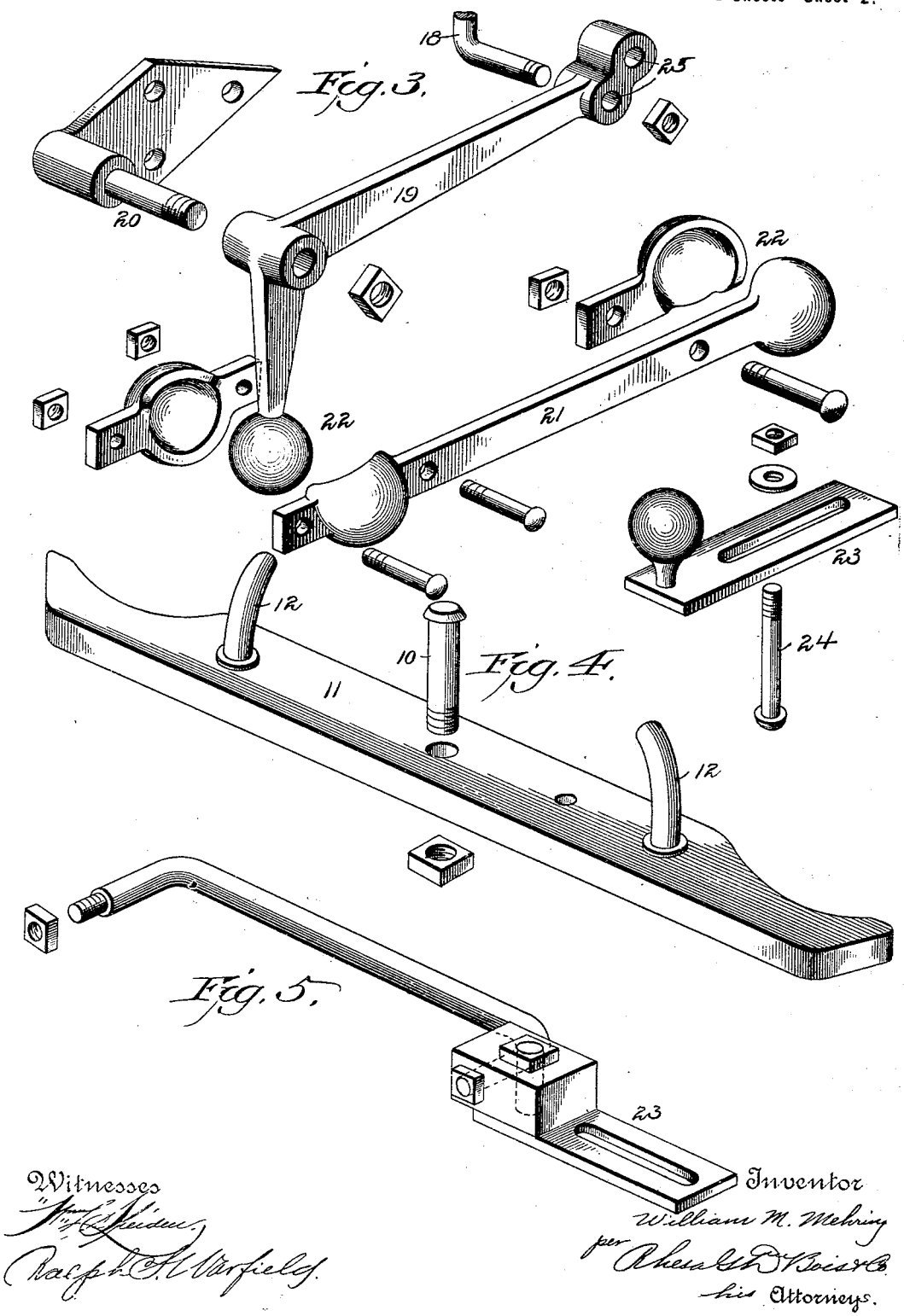

No. 638,640. Patented Dec. 5, 1899.
W. M. MEHRING.
COW MILKER.
(Application filed Feb. 8, 1899.)
(No Model.) 3 Sheets—Sheet 3.
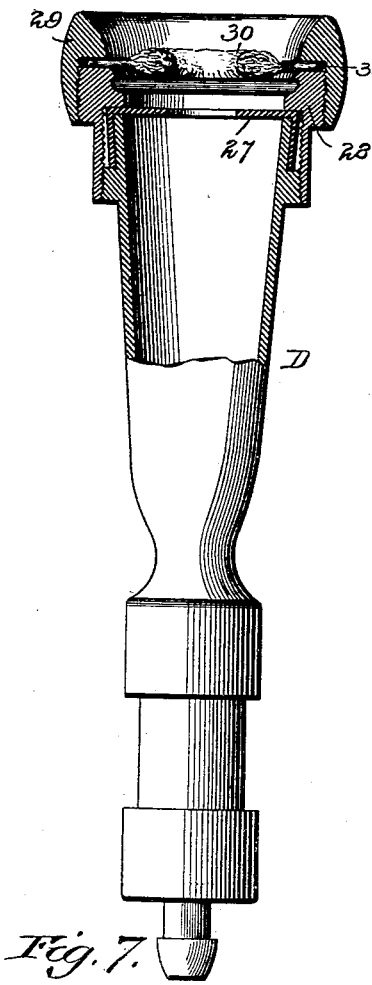
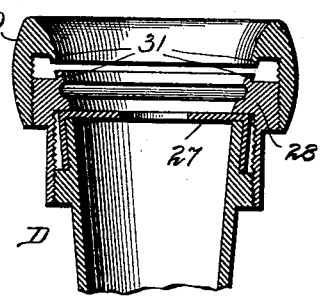
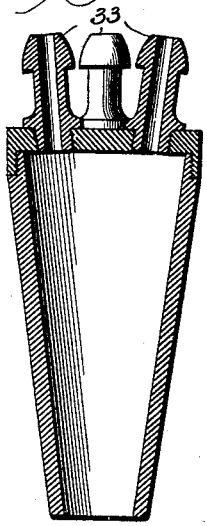
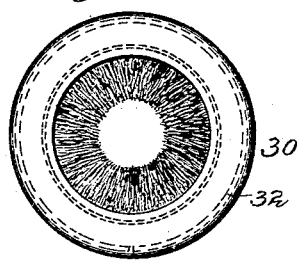
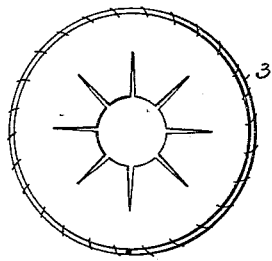
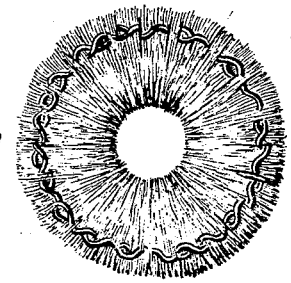
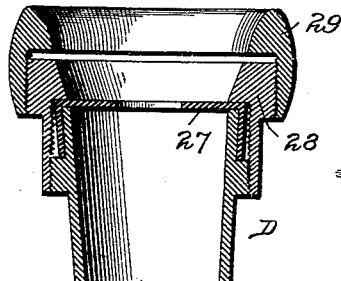
Witnesses
Inventor
William M. Mehring
per
his Attorneys.

UNITED STATES PATENT OFFICE.

WILLIAM M. MEHRING, OF YORK ROAD, MARYLAND.

COW-MILKER.

SPECIFICATION forming part of Letters Patent No. 638,640, dated December 5, 1899.

Application filed February 8, 1899. Serial No. 704,924. (No model.)

*To all whom it may concern:*

Be it known that I, WILLIAM M. MEHRING, a citizen of the United States of America, residing at York Road, in the county of Carroll and State of Maryland, have invented certain new and useful Improvements in Cow-Milkers, of which the following is a specification.

My invention relates to an improvement in cow-milkers; and the primary object is to save time in the milking of a large number of cows, and this is accomplished by making it possible to milk either one or two cows at a time and by providing a machine which can be operated and controlled entirely by a single person, as contradistinguished from those commonly employed hitherto, which necessitate two operators for a single cow.

Further objects are to provide for the comfort of the operator while milking the cows, and a still further object is to provide an improved teat tube and wetter to be used with the apparatus.

With the foregoing objects in view my invention consists in a framework, a seat adjustably connected therewith, a treadle, a pump, and means for communicating motion from the treadle to the pump for drawing the milk from the bag of the cow or cows being milked.

It further consists in a teat tube or tubes constructed with a teat-wetter.

The invention still further consists in several minor features of construction and combinations of parts, which will be hereinafter described, and pointed out in the claims.

In the accompanying drawings, Figure 1 is a view in perspective of my improved cow-milking apparatus. Fig. 2 is a detached view of the bell-crank lever and ball-and-socket-joint connections. Fig. 3 is a modification of said parts. Figs. 4 and 5 are detail views of parts of the apparatus. Fig. 6 is a vertical sectional view of one of the teat-tubes. Figs. 7 and 8 are modifications of the same. Fig. 9 is a sectional view of the four-way plug, and Figs. 10, 11, 12, and 13 are views of different forms of teat-wetters.

A represents the main frame of the machine. This frame extends upwardly in an upright or vertical direction and has connected with its lower end the cross-piece 1, which is mounted on a pair of legs 2 2, adjustable vertically thereon to give the desired height to the frame from the ground. An arm 3 is rigidly secured to the frame A at or near its lower end, and this arm extends outward for some distance in a horizontal direction. Connected with the outer end of the arm is a seat or stool B. This seat or stool is supported upon a pair of legs 4 4 and is provided, preferably, with a padded back 5, which forms a rear support for the body of the operator, this back being held rigidly in place by the braces 6 6, one at each side. The seat or stool is capable of adjustment along the arm a limited distance to regulate its position to the length of the operator's legs, this adjustment being conveniently effected by means of bolts or screws 7 7, passed through the elongated slots 8 8 in the arm 3, thumb-nuts or similar devices 9 9 being employed to secure the seat or stool wherever it may be desirable to place it with respect to the arm.

Pivoted on a vertical stud 10 in the forward end of the arm 3 and usually just back of the vertical frame A is the treadle 11, its two ends extending out horizontally in opposite directions and having footholds to receive the operator's feet. Vertical guards 12 12 are placed just inside of these footholds to prevent the operator's feet from sliding inward or getting in contact with any of the other parts of the machine.

C indicates the pump. This is strapped or otherwise secured in any convenient manner to the upper end of the frame A. The pump has two nozzles 13 13, each being controlled by stop-cocks 14. The pump has a spout extending forwardly and downwardly, upon which an upwardly-projecting lug is formed for the support of the pail, and a bracket 15, projecting out from the frame, affords a lateral support for the pail. The pump is provided on the outside with an exhaust-air chamber 16, and inside it has the usual pump-piston, from which extends the piston-rod 17. To this piston-rod is connected the connecting-rod 18, and the latter extends downwardly to a point in proximity to the treadle, at which point it is connected with a bell-crank lever 19, the latter having a pivotal connection through the bearing 20, supported on the main frame, and a pitman 21 connects this bell-crank lever with the treadle, preferably by means of ball-and-socket joints 22 22, although, as shown in the modified form illustrated in Fig. 5, these connections might be hinge-joints instead of ball-and-socket joints. To give greater or less elevation to the moving parts, the pitman may have an adjustable connection with the treadle through the slotted plate 23 and by means of the bolt 24, passed through the slot therein and through the treadle. To further regulate the operation of the piston, the bell-crank lever is provided with one or more holes 25 for the end of the connecting-rod 18 to be placed therein.

A handle 26 is secured to the main frame at or just above the center of gravity, so that the operator can easily carry the entire machine in one hand and place it in position by the side of a cow or between two cows.

D D represent the teat-tubes. These are all constructed alike, and they are connected together in sets of four, one for each teat of the cow's bag. These tubes preferably taper more or less from one end to the other, and in their interior are made to approximately conform to the length and shape of a cow's teat. At the upper end they are provided with a soft-rubber disk 27, which yields readily to the teat and which forms an air-tight joint between the tube and the teat. A clamping-ring 28 holds this rubber disk in place on the tube, and by placing washers on this clamp between the teat-wetter and ring 29 it also serves as a means for lengthening the tube a limited amount or shortening it to fit the cow's teat. A ring 29 screws on the clamping-ring and holds between it and the clamping-ring a teat-wetter 30, and an annular recess formed in the inner surface of the clamping-ring is adapted to receive this wetter, if the space at that point is sufficiently restricted to require it. If the self-wetter is small or the cow's teats are small, this annular cavity may be dispensed with, as shown in Fig. 7, or as a means for securely attaching the self-wetter and preventing the ingress of milk or water to the screw-threads of the outer ring the annular lips 31 31 may be provided, as shown in Fig. 8.

The self-wetter may itself be variously constructed, and I have shown three or four different forms, as will be seen in Figs. 10, 11, 12, and 13. These may be constructed in the following manner—to wit, by stretching a wire 32 over a grooved wheel and then placing under the wire a strip of cloth, thin leather, or even tin, and placing wool, felting, or other filamentous material between the cloth and wire, after which the cloth and wool are doubled over the wire and the parts sewed or otherwise fastened together. Finally the wire is bent around into a ring, as shown in Figs. 10, 11, and 12. When felting is used, the covering of cloth may be omitted. To hold the ends of the ring together, they may be sewed or otherwise secured, or they may be left open. In Fig. 11 chamois-skin is employed in lieu of the wool or filamentous material. In this form the wire may be used or omitted, and if omitted the edge of the chamois-skin may be stiffened with paste or cement. In lieu of chamois-skin sponge may be employed, and whichever is used it is preferably slotted, as shown, to facilitate the entrance of the teat into it. In Fig. 12 still another form of self-wetter is illustrated. This is made by twisting wool or other filamentous material between two wires and then bending the wire into a ring or circle. The object of these devices is to moisten the teat, which is necessary, or at least expedient, in the operation of milking.

In Fig. 9 is shown the four-way plug for concentrating the milk from the four teat-tubes into a common hose which attaches to one of the nozzles 13. This four-way plug is preferably made in two parts screwed together, so that it can be taken apart and easily cleaned, as well as the little nipples 33, to which the rubber tubes 34 from the teat-tubes are attached.

The machine is operated as follows: The operator adjusts the seat or stool, if it has not already been, or, assuming that it has, the machine is ready for operation. The operator takes the machine by the handle and carries it to a position beside a cow or between two cows. He then seats himself and places his feet upon the treadles, the pail having been hung upon the spout, and the teat-tubes, all four, or eight, accordingly as one or two cows are to be milked, are dipped in water to wet the teat-wetters. Then the teat-tubes are placed below the respective teats of one cow and the pump is operated, the suction causing the tubes to slide up on the teats. If there are two cows, the other tubes are applied in the same way. The operator now operates the pump until the cow or cows are milked, after which operation the machine is removed and the tubes applied to another cow or cows, and so on. By the use of this machine a large number of cows can be milked in an inconceivably short space of time, and at the same time the milking is done in the natural method and with the utmost cleanliness, which is a thing, above all, to be sought after, as well as the care of the cow's bag and teats, which are in this way all subjected alike to the same treatment and simultaneously, thus avoiding injury or impairment to the organs.

It is evident that other slight changes besides those hitherto mentioned might be resorted to in the form and arrangement of the several parts described without departure from the spirit and scope of my invention, and hence I do not wish to limit myself to the precise constructions herein shown and described; but,

Having thus described my invention, what I claim as new, and desire to secure by Letters Patent, is—

1. In a cow-milker, the combination with a frame and a pump connected therewith for creating a suction upon a cow's teats, of a seat connected with the frame and a treadle for operating the pump, said treadle adapted to swing toward and away from the seat.

2. In a cow-milker, the combination with a frame and a pump connected therewith for creating a suction upon a cow's teats, of a seat connected with the frame and a treadle for operating the pump, the seat being adjustable with respect to the treadle and a treadle pivoted to a swing in a horizontal plane toward and away from the seat.

3. In a cow-milker, the combination with a vertical or upright frame, an arm extending horizontally therefrom, a seat or stool adjustably connected with the arm and a treadle pivoted to said arm to swing in a horizontal plane toward and away from the seat, of a pump and means extending from the treadle to the piston-rod of the pump for communicating motion from the treadle thereto.

4. In a cow-milker, the combination with a vertical or upright frame, a cross-piece on the lower end, legs adjustably connected with this cross-piece, an arm extending horizontally from the frame and a seat connected with the outer end of the arm and having legs thereon, of a treadle pivoted to the arm to swing in a plane toward and away from the seat, a pump connected with the frame and means extending from the treadle to the pump-piston for communicating motion thereto.

5. In a cow-milker, the combination with an upright or vertical frame and a pump supported thereon, of a treadle, a bell-crank lever, a pitman, ball-and-socket-joint connections between the pitman and lever and treadle and a connecting-rod extending from the bell-crank lever to the piston-rod of the pump.

6. In a cow-milker, the combination with an upright or vertical frame and a pump supported thereon, of a treadle, a bell-crank lever, a pitman, ball-and-socket-joint connections between the pitman and lever and treadle, and a connecting-rod extending from the bell-crank lever to the piston-rod of the pump, said pitman having an adjustable connection with the treadle.

7. In a cow-milker, the combination with an upright or vertical frame and a pump supported thereon, of a treadle, a bell-crank lever, a pitman, ball-and-socket-joint connections between the pitman and lever and treadle, and a connecting-rod extending from the bell-crank lever to the piston-rod of the pump, said connecting-rod having an adjustable connection with the bell-crank lever.

8. In a cow-milker, a teat-tube having a self-wetting device therein.

9. In a cow-milker, a teat-tube having a self-wetting device therein, said wetter comprising an outer ring and a soft inwardly-projecting material adapted to bear gently upon the teat.

10. In a cow-milker, the combination with a teat-tube and a clamping-ring adjustably secured thereon, of a ring secured to this clamping-ring and a wetting device held between the two rings.

11. In a cow-milker, the combination with a teat-tube and a clamping-ring, said clamping-ring having an annular cavity therein, of a ring secured to this clamping-ring and a wetting device held between the two rings.

12. In a cow-milker, the combination with a vertical or upright frame, and an arm extending horizontally therefrom, a seat or stool attached to the arm, a treadle pivoted to swing horizontally upon the arm, a pump attached to the upright frame, a spout to said pump, and a bracket to support the pail laterally.

WM. M. MEHRING.

In presence of—
ELI HILTABIDLE,
ADDIE L. LITTLE.